United States Patent Office 2,887,741
Patented May 26, 1959

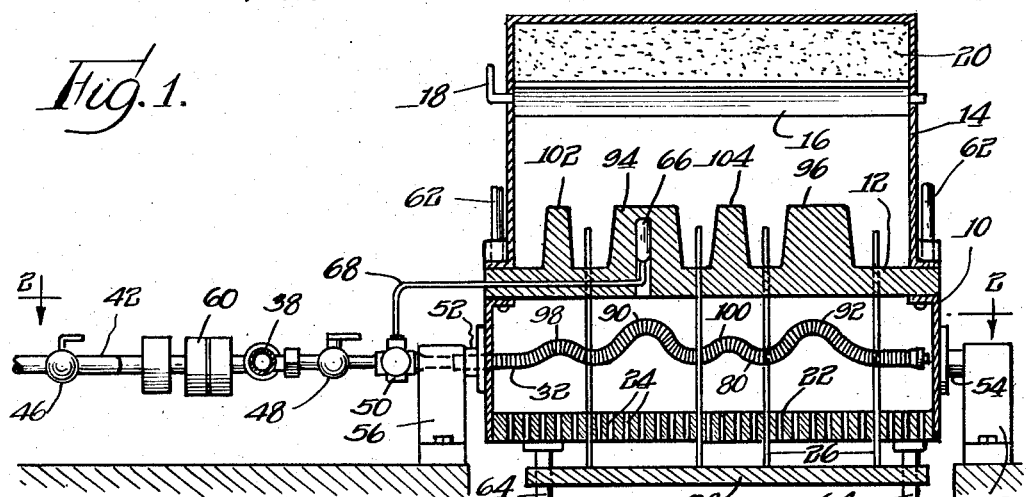
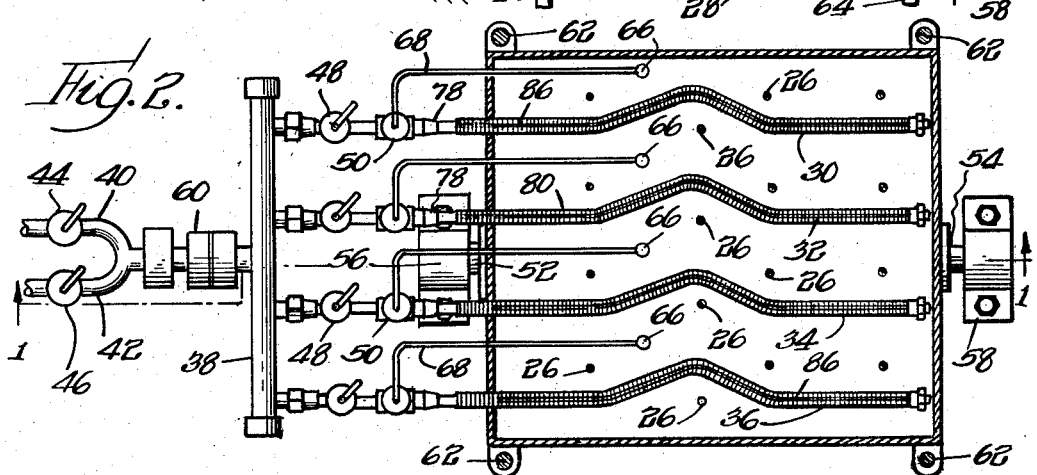
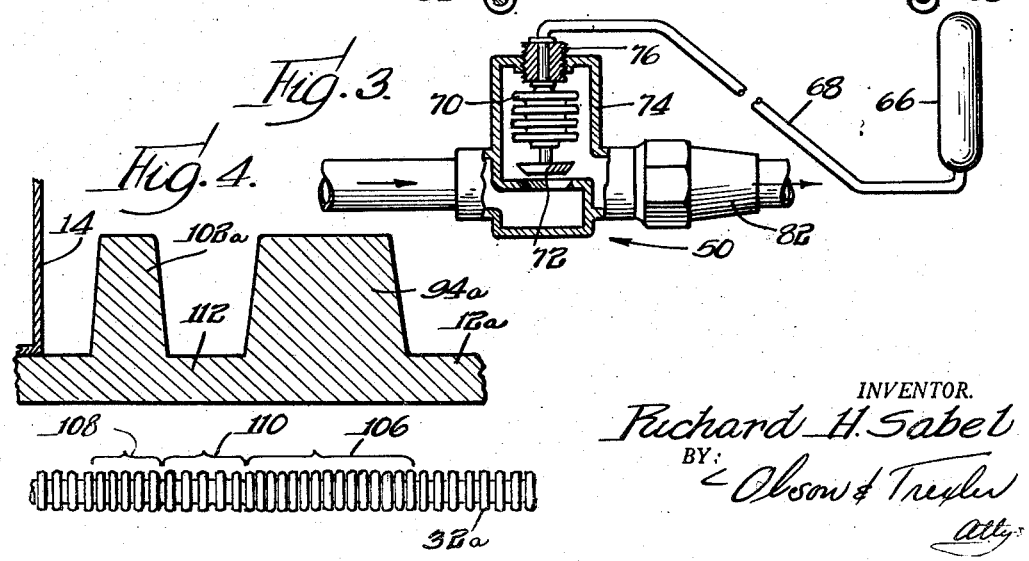

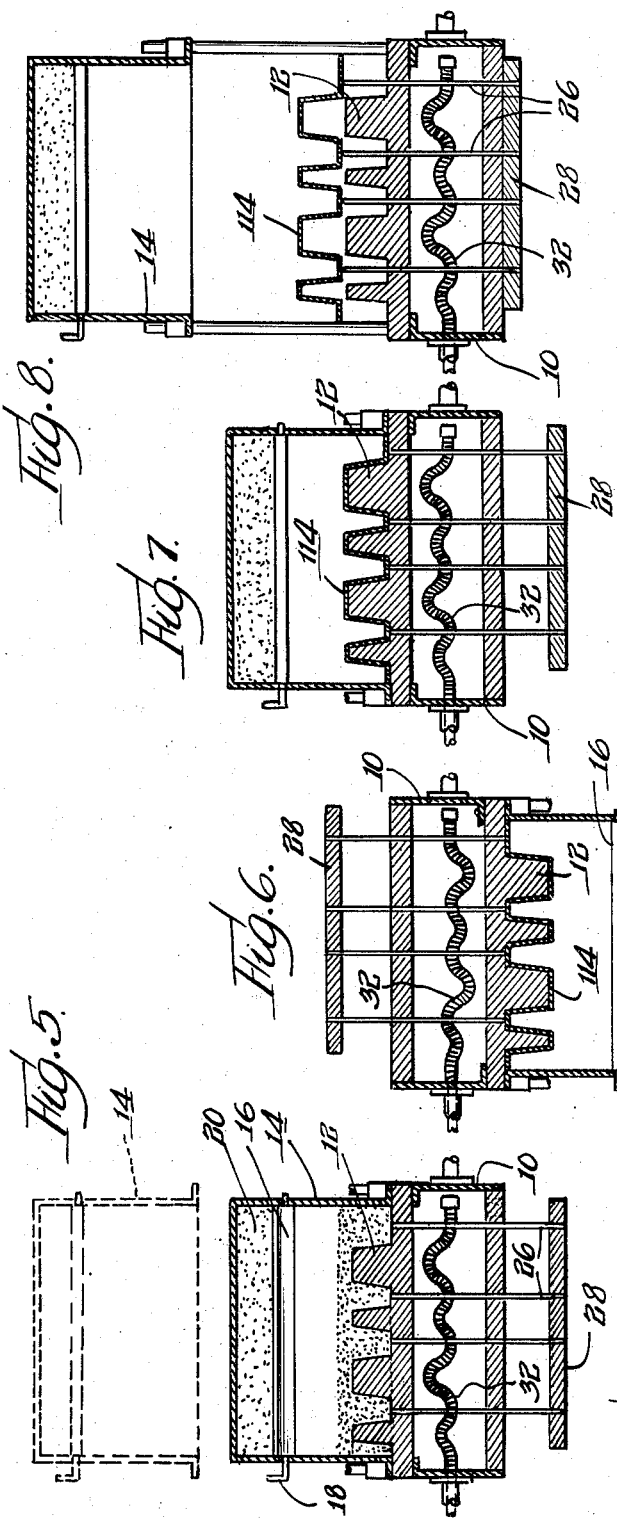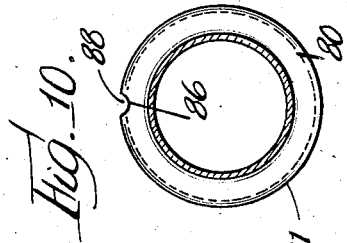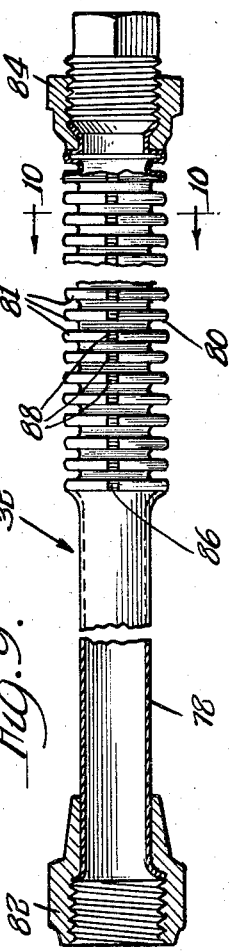

2,887,741

SHELL MOLDING APPARATUS

Richard H. Sabel, Riverside, Ill., assignor to Flexonics Corporation, Maywood, Ill., a corporation of Illinois Application October 11, 1954, Serial No. 461,392

4 Claims. (Cl. 22—32)

This invention relates to shell molding apparatus, and particularly to the burner structures thereof.

Shell molding is a technique for making castings more accurately than can be accomplished with ordinary sand molds. The method for making shell molds entails the use of a layer of sand and resinous binder material disposed upon a pattern and subjected to heat, resulting in the formation of a rigid shell of predetermined thickness upon the pattern and conforming to the contour thereof.

The process of shell molding has many advantages over conventional molding techniques employing green or dried sand. Castings obtained from shell molds are of close tolerances, reducing machining operations on the castings with attendant saving in labor costs. The use of shell moldings has further economical manufacturing advantage in that pouring operations are facilitated, and misruns and mechanical casting defects are avoided. The production of shell molds may be mechanized, permitting the employment of unskilled labor. Further, the quantity of sand-to-casting weight is reduced, minimizing requisite sand handling equipment and manufacturing floor space allotted to the molding operations.

However, in shell molding techniques as heretofore developed, difficulty has been encountered in securing uniform heating of the mold, particularly in the case of irregular patterns.

Conventional shell molding machines employ gas or electric heating elements which are inadequate and insufficiently adaptable to provide a desired heat pattern. In most instances, with irregular patterns, insufficient heat is applied in certain areas, and excess heat is applied in others, resulting in uncured and burned mold portions in the completed molds. Further, conventional burners or heating elements, as heretofore used, are insufficiently adaptable for different patterns, entailing heavy replacement costs; and insufficiently adaptable for use with variously located ejector pins, with the same result.

It is an object of the present invention to improve shell molding apparatus having a burner structure incorporated therein, and to provide a burner structure for shell molding apparatus, of improved construction and design.

More specifically stated, it is an object of the present invention to provide an improved burner structure and shell molding apparatus, wherein the shell mold may be uniformly heated regardless of irregularities in the mold pattern; and wherein the same burner may be rendered adaptable to different patterns, and to various arrangements of ejector pins, whereby to avoid burner replacement and substitution within the molding apparatus.

A further object of the invention is to provide a shell molding apparatus, and burner construction therefor, wherein the burner may be continuously operated to reduce the shell molding time, and to avoid chill spots on the pattern resulting in the production of unsatisfactory molds.

A further object of the invention is to provide an improved shell molding apparatus, and burner structure, avoiding the difficulties heretofore encountered in the use of conventional shell molding equipment.

Various other objects, advantages and features of the invention will be apparent from the following specification when taken in connection with the accompanying drawings wherein certain preferred embodiments are set forth for purposes of illustration.

In the drawings, wherein like reference numerals refer to like parts throughout:

Fig. 1 is a general assembly view, somewhat diagrammatic in form and taken as indicated by the section line 1—1 of Fig. 2, of a shell molding apparatus incorporating a burner constructed in accordance with and embodying the principles of the present invention;

Fig. 2 is a horizontal sectional view of the apparatus of Fig. 1, taken as indicated by the line 2—2 thereof;

Fig. 3 is an enlarged detail view of one of the thermostatic control elements, forming a part of the present invention;

Fig. 4 is a partial view of the structure of Fig. 1, on an enlarged scale, and illustrating a modified form of the invention;

Figs. 5, 6, 7 and 8 are diagrammatic views illustrating the sequence of operations in the use of the shell molding apparatus of Fig. 1;

Fig. 9 is an enlarged detail view of one of the burner tubes; and

Fig. 10 is a further enlarged detail view of the burner, in transverse section, and taken as indicated by the line 10—10 of Fig. 9.

This application is a continuation-in-part of the copending application of Richard H. Sabel, Serial No. 448,-436, filed August 9, 1954, and entitled "Flexible Gas Burner."

Referring more particularly to the drawings, in Fig. 1 there is illustrated a shell molding apparatus comprising a casing 10 arranged to support a pattern 12, and upon which there is superposed a vertically shiftable cage or sand reservoir as indicated at 14. The cage 14 is provided with a series of louvers 16 manipulatable by a handle 18, and by means of which a mixture of sand and resinous binder may be dropped by gravity from an upper storage chamber 20 onto the surface of the pattern. The lower part of the frame 10 has a closure plate 22, provided over its entire area with a series of perforations 24, through certain of which project ejector pins 26 actuated by a shiftable ejector plate 28, and employed to remove the completed mold from the upper face of the pattern, as will hereinafter be more particularly set forth.

As best shown in Figs. 1 and 2, within the casing 10 there is provided a flexible burner structure composed, in the particular embodiment shown, of a series of four flexible burner tubes 30, 32, 34 and 36, Fig. 2, connected to and supplied with a combustible gas mixture from a rigid manifold conduit or pipe 38. The manifold 38 is in turn supplied from a gas pipe 40 and an air pipe 42, under control of manually operable valves 44 and 46, respectively, as shown. Each burner tube is provided with an individual manually operable control valve 48, and also with a thermostatically controlled valve 50, the details of which will be later described.

The casing 10 is rotatable upon trunnions 52 and 54 supported by suitable bearing or pillow blocks 56 and 58, respectively. To accommodate such movement the supply pipe to the manifold 38 is provided with a swivel joint or coupling 60 so that manifold 38 and the associated flexible burner structure 30—36 may rotate as a unit with the casing 10, and relative to the fixed gas and air supply pipes 40—42. It will be noted that the swivel coupling 60 is coaxial with the trunnions 52 and 54.

The cage 14 is vertically shiftable upon uprights or standards 62 suitably carried by the casing or frame 10; whereas the ejector plate 28 is vertically shiftable upon guide bars 64 which are also suitably carried by the casing structure. As will be understood, the pattern 12 is rigidly fixed to the casing 10, and moves therewith.

Each of the flexible gas burners is preferably individually controlled by individual thermostatic means 50, as has heretofore been pointed out. The details of such thermostatic means is shown in Figs. 1, 2 and 3.

More particularly, at suitable selected points in the pattern thermostatic bulbs 66 are provided filled with a suitable heat sensitive liquid, expansible upon an increase in temperature. By means of conduits 68 the bulbs 66 are interconnected, respectively, with bellows 70 forming a part of the valves 50, each bellows being arranged upon its expansive and contractive movements to actuate an associated valve 72. Each bellows is adjustably mounted within the valve casing 74 by means of a threaded adjustment plug 76, adjustable to vary the initial valve position. It will be seen that by reason of the construction thus provided, each flexible burner is individually controlled by its associated thermostatic sensing element or bulb 66, the arrangement being such that upon an increase in pattern temperature, the fluid within the bulb expands to thereby expand the bellows and move the valve toward closed position, to correspondingly reduce the gas flow. As stated, by means of the adjustment plug 76 the initial or reference position of the valve is adjustable to the desired predetermined temperature.

The details of the flexible burners are set forth in said companion application, Serial No. 448,436, and are illustrated herein in Figs. 9 and 10. Each flexible burner, for example the burner 32, is formed of a length of rigid tubing 78, and a length of flexible tubing 80 which may be either helically or annularly corrugated, but in the embodiment shown is annularly corrugated, viz., provided with annular corrugations 81 throughout the length of the flexible tubing section. Such annular corrugations may be formed by any suitable known means, such as by rolling or hydraulic forming and the like, for forming such corrugations into flexible metal tubing. The inlet end of the rigid conduit section 78 is provided with a suitable coupling piece 82 for attachment to the adjacent conduit connections, and the opposite end of the flexible tubing section is provided with a suitable plug assembly 84. As more particularly pointed out in said companion application, the flexible tubing is provided with one or more longitudinal kerfs, as indicated at 86, Figs. 9 and 10, whereby to provide a series of individual gas burner openings 88 at the apex or crest of each tubing convolution. In the use of the burner, the gas escapes and burns upwardly toward the pattern from these openings, as will be understood; and their density and position are controlled by the longitudinal and lateral bending or shaping of the tube. By reason of the disposition of the openings at the convolution crests the burner life is increased; and the burner provides increased burning efficiency as compared with ordinary or conventional burner structures.

The flexible tubing section 80 of each flexible burner may readily be bent, by hand, as illustrated in Figs. 1 and 2, and upon being so bent will remain in adjusted position. Thus, referring to Fig. 1, it will be seen that the tubing may be bent, if desired, to provide a pair of relatively higher loops 90 and 92, closely disposed to the relatively larger or more massive pattern portions 94 and 96; and with a pair of relatively lower loops 98 and 100 suitably more remotely disposed in respect to the smaller or less massive pattern portions 102 and 104. In this way the tubing may be shaped to provide uniform heating for the pattern, as to all parts thereof; and the same tubing, by different shaping, may be made to conform to the variations in different patterns.

By reference to Fig. 2, it will be seen that the flexible burner tubings may also be shaped to accommodate or provide clearance for the various mold ejecting pins 26, so that the pins may be advantageously placed to conform to the requirements of any particular pattern, without interference from the burner parts.

In Fig. 4 a modified embodiment is illustrated wherein the flexible burner 32a is so shaped or bent as to provide closely spaced convolutions 106 in the vicinity of the massive pattern portion 49a, less closely spaced convolutions 108 in the vicinity of the less massive pattern portion 102a, and still less closely spaced convolutions 110 in the vicinity of the relatively thin pattern portion indicated at 112. Thus it will be seen that instead of lateral bending, the convolutions of the flexible burner tubing may be longitudinally expanded or compressed to provide a desired heat pattern; or the tubing may be both laterally and longitudinally shaped, if desired.

The operation of the apparatus and flexible burner are illustrated in the sequence views, Figs. 5–8. In forming a shell mold the hopper or cage 14 is lowered from its dotted line position to its solid line position, as shown in Fig. 5, whereupon the louvers may be manipulated by handle 18 so as to drop a predetermined quantity of sand and resin mix onto the upper surface or face of the pattern 12. As will be understood, the pattern has previously been brought to desired heat by operation of the flexible burner structure. The ejector pins are withdrawn.

The casing or frame 10 is then rotated about the axis of the burner supply to the position of Fig. 6, whereupon the excess mix returns to the reservoir 20 through the louvers, leaving a layer 114 of the mix on the face of the pattern in the form of a shell mold. This layer adheres to the pattern face as the resin in that portion of the mix which contacts the pattern is liquefied and thus rendered adhesive. A thermosetting of the mix begins.

The casing 10 and associated pattern are then rotatively returned to their Fig. 7 position, whereupon by the continued application of heat from the burner a curing or setting of the mold 114 is effected.

The final operation is illustrated in Fig. 8 wherein the cage 14 is raised, and the completed shell mold lifted from the pattern by the ejector pins 26, for removal from the apparatus.

The burners may be maintained in operation continuously during the entire cycle, as distinguished from the provision of removable overhead burners or ovens, whereby to minimize the time consumed for the molding operations. Also, by the continued application of the heat, the pattern temperature may be maintained as the sand and resin mix initially contacts the pattern, thus avoiding "spot chilling." Particularly is the flexible burner arrangement of advantage in maintaining uniformity in the heating of the pattern whereby to effect adequate curing of all parts of the mold, but without burning of any part thereof. It will be seen that the burner may be shaped, or reshaped, in accordance with experience; and to conform to various patterns without burner remodeling or substitution. The ejector pins may be advantageously positioned, or adjusted, so as to engage the shell mold at the most advantageous locations, but without interference from the burner which can be either longitudinally or laterally adjusted, or both, to provide clearance for the pins while at the same time providing a desired heat pattern. In this connection the combined longitudinal and lateral adjustments of the tubing are advantageous in that longitudinal adjustment may be made to maintain the desired heat pattern and compensate for lateral adjustments made to provide pin clearance, or vice versa.

It is obvious that various changes may be made in the specific embodiments set forth, without departing from the spirit of the invention. The invention is accordingly not to be limited to the particular embodiments shown and described, but only as indicated in the following claims.

The invention is hereby claimed as follows:

1. Apparatus for forming a shell mold comprising a pattern having portions of greater and lesser mass, means for supporting the pattern, means for applying a mold forming mix to the face of the pattern, an ejector plate carrying ejector pins operable through the pattern to engage and remove the mold from the pattern face, and heating means in the form of a length of corrugated tubing flexible longitudinally and laterally and having inner and outer convolutions with a longitudinal series of openings in the outer convolutions forming the burner outlet, said tubing being positioned between the ejector plate and pattern traversing the space below the pattern and flexed to concentrate maximum heating at the pattern portions of greater mass with lesser heating effects at the pattern portions of lesser mass.

2. Apparatus as claimed in claim 1, wherein the tubing is flexed laterally of its longitudinal axis to position certain portions thereof closer to the pattern portions of greater mass and to position other portions thereof more remote from pattern portions of lesser mass.

3. Apparatus as claimed in claim 1, wherein the tubing is flexed longitudinally to position an increased number of burner openings in the region of the pattern portions of greater mass and to position more widely spaced burner openings adjacent the pattern portions of lesser mass.

4. Apparatus for forming a shell mold comprising a pattern and means for supporting the same, means for applying a mold forming mix to the face of the pattern, an ejector plate carrying ejector pins operable through said pattern to engage and remove the mold from the pattern face, and heating means in the form of a burner comprising a length of flexible corrugated tubing having inner and outer convolutions with a longitudinal series of openings in the outer convolutions forming the burner outlet and positioned between the ejector plate and pattern and flexed in accordance with the positioning of the ejector pins to clear the same in traversing the space below the pattern.

References Cited in the file of this patent

UNITED STATES PATENTS

| | | |
|---|---|---|
| 1,405,386 | Baluss | Feb. 7, 1922 |
| 1,560,550 | Dunkerly | Nov. 10, 1925 |
| 1,686,604 | Dester | Oct. 9, 1928 |
| 2,518,996 | Peckham | Aug. 15, 1950 |
| 2,659,945 | Valyi | Nov. 24, 1953 |
| 2,733,489 | Dahmer | Feb. 7, 1956 |
| 2,737,233 | Mueller | Mar. 6, 1956 |

FOREIGN PATENTS

| | | |
|---|---|---|
| 1,059,189 | France | Nov. 10, 1953 |